United States Patent [19]

Johansson et al.

[11] 4,129,477
[45] Dec. 12, 1978

[54] AXIALLY ALIGNABLE NUCLEAR FUEL PELLETS

[75] Inventors: Eric B. Johansson, San Jose; Dale H. Klahn, Berkeley; Mickey O. Marlowe, Livermore, all of Calif.

[73] Assignee: General Electric Company, San Jose, Calif.

[21] Appl. No.: 748,652

[22] Filed: Dec. 8, 1976

[51] Int. Cl.² ............................................. G21C 3/02
[52] U.S. Cl. .................................................... 176/73
[58] Field of Search ........................ 176/68, 73, 76, 78

[56] References Cited

U.S. PATENT DOCUMENTS

| | | | |
|---|---|---|---|
| 3,028,329 | 4/1962 | Mahlmeister | 204/193.2 |
| 3,184,392 | 5/1965 | Blake | 176/73 X |
| 3,192,621 | 7/1965 | Bauer et al. | 176/73 X |
| 3,227,622 | 1/1966 | White | 176/73 X |
| 3,230,152 | 1/1966 | Kerze, Jr. | 176/73 X |
| 3,415,911 | 12/1968 | Lloyd | 264/0.5 |
| 3,466,226 | 9/1969 | Lass | 176/68 |
| 3,801,451 | 4/1974 | Scharf | 176/73 |
| 3,804,708 | 4/1974 | Nilson | 176/68 |
| 3,949,027 | 4/1976 | Flipot et al. | 176/73 X |

FOREIGN PATENT DOCUMENTS

| | | | |
|---|---|---|---|
| 725277 | 1/1966 | Canada | 176/73 |
| 884969 | 12/1961 | United Kingdom | 176/73 |

Primary Examiner—Peter A. Nelson
Attorney, Agent, or Firm—Ivor J. James, Jr.; Samuel E. Turner; Sam E. Laub

[57] ABSTRACT

The invention is directed to an axially alignable nuclear fuel pellet of the type stacked in end-to-end relationship within a tubular cladding. Experience has shown that fuel cladding failures can occur at pellet interface locations due to mechanical interaction between misaligned fuel pellets and the cladding. Mechanical interaction between the cladding and the fuel pellets loads the cladding and causes increased cladding stresses. Nuclear fuel pellets constructed according to the invention are provided with an end structure that increases plastic deformation of the pellets at the interface between pellets so that lower alignment forces are required to straighten axially misaligned pellets. Plastic deformation of the pellet ends results in less interaction between the cladding and the fuel pellets and significantly lowers cladding stresses. The geometry of pellets constructed according to the invention also reduces alignment forces required to straighten fuel pellets that are tilted within the cladding. Plastic deformation of the pellets at the pellet interfaces in both axial and transverse directions is increased by providing pellets with at least one end face having a centrally-disposed raised area of generally convex shape so that the mean temperature and shear stress of the contact area is much higher than that of prior art pellets. Fuel pellets constructed according to the invention may be provided with one end having a centrally-disposed raised area and the opposite end flat or the opposite end may also be provided with a centrally-disposed raised area, or the opposite end may be provided wth a centrally-disposed depression having a depth less than the height of the raised area of an adjacent pellet.

48 Claims, 24 Drawing Figures

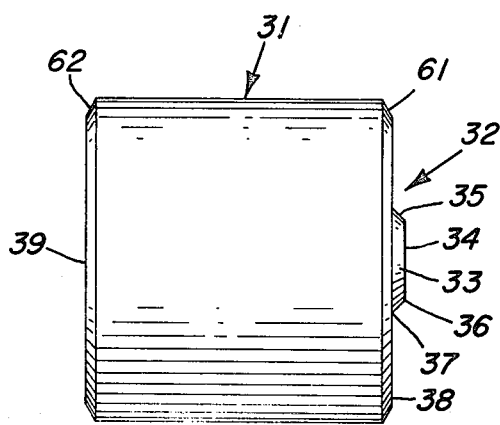
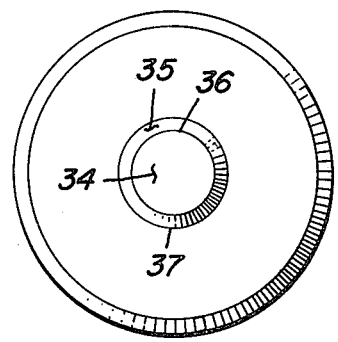
Fig. 8         Fig. 9
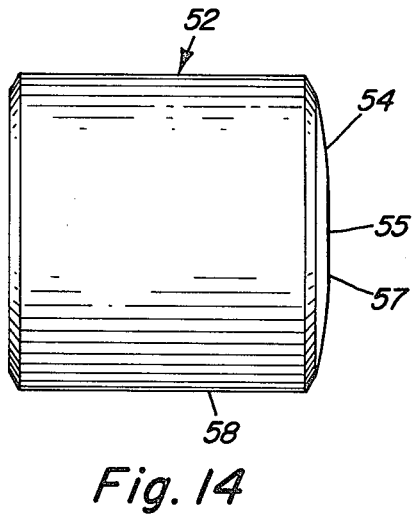
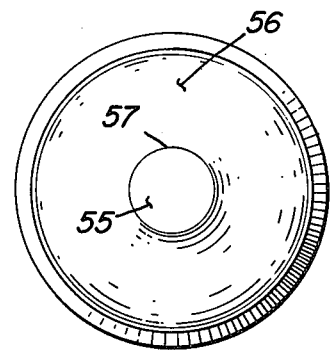
Fig. 14        Fig. 15
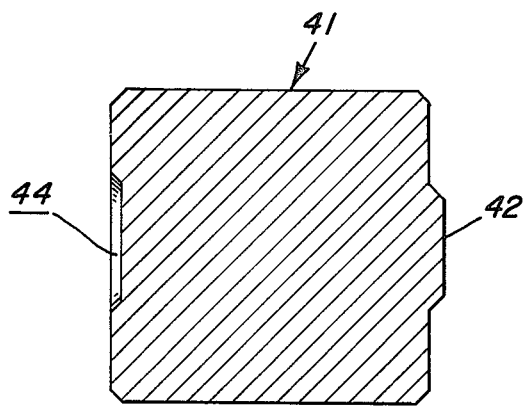
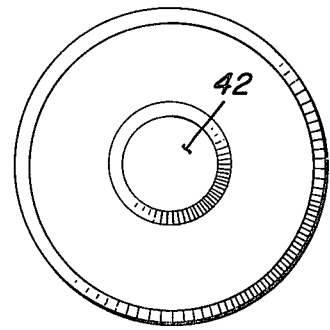
Fig. 11        Fig. 12

AXIALLY ALIGNABLE NUCLEAR FUEL PELLETS

BACKGROUND OF THE INVENTION

The invention relates to fuel for a nuclear reactor and more particularly is directed to generally cylindrical axially alignable nuclear fuel pellets of the type stacked in end-to-end relationship within a tubular nuclear fuel cladding.

Nuclear reactors are described, for example, in "Nuclear Power Engineering" by M. M. El-Wakil published by the McGraw-Hill Book Co., Inc. 1963. Nuclear fuel elements are shown, for example, in U.S. Pat. No. 3,466,226 to J. L. Lass. The patent to Lass shows a nuclear fuel element comprised of an elongated tubular cladding containing a fissionable material such as uranium and/or plutonium dioxide ($UO_2$, $PuO_2$) sealed therein. In the present invention this fuel material is in the form of fuel pellets which are stacked in end-to-end relationship within the cladding. These fuel pellets are pressed from a powder and sintered so that they have a ceramic-like consistency before they are stacked and sealed within the tubular cladding.

Experience has shown that fuel cladding failures or perforations tend to occur at pellet interface locations due to the mechanical interaction (pellet-clad interaction) of the pellet and the cladding. Experience indicates that one contribution to such failures is the axial misalignment of adjacent fuel pellets of the stack. Axial misalignment as used herein is intended to include fuel pellets with centerlines that are displaced and/or tilted with respect to the centerline of the tubular cladding.

Axially misaligned fuel pellets may initially be due to a stochastic or random distribution of the fuel pellets within the cladding during the assembly of the fuel element. This stochastic distribution occurs because dimensional and assembly tolerances allow fuel pellets to be stacked in axially misaligned positions. Manufacturing tolerances prevent the end faces of the pellets from being perpendicular to the center axis of the pellets. Thus, as the pellets are stacked in the cladding each pellet is tilted by the deviation of its lower end face, and the cumulative deviations of the end faces of the pellets below. In most nuclear reactor fuel elements a large fraction of the fuel pellets will be tilted by the maximum amount allowed by an annular gap normally provided between the fuel pellets and the cladding. This stochastic distribution is further aggravated by the cumulative effects of fuel rod vibration, and the swelling and cracking of the pellets during irradiation.

During irradiation the fuel pellets may become locked in axially misaligned positions due to the combined effects of axial friction, (resulting from pellet swelling and from larger coefficient of thermal expansion and higher average temperature of the fuel pellets relative to the cladding) and transverse friction at the then compressively loaded pellet interfaces. Once the pellets become locked in misaligned positions, subsequent radial expansion of the pellets at higher power levels causes pellet-clad interaction which induces cladding failure. Perforations in the cladding may occur due to overstressing of the cladding or due to an increase in stress corrosion cracking of the cladding.

Cladding failures in fuel elements having misaligned fuel pellets occur at significantly lower power levels than in nuclear fuel elements where the pellets remain axially aligned. Thus, pellet-clad interaction due to axially misaligned pellets significantly lowers the absolute power level at which a nuclear fuel element may be operated without cladding failure.

Pellet-clad interaction has also forced the operators of nuclear power plants to substantially reduce the rates at which load following power changes may be made. This is because the larger coefficient of thermal expansion and the higher average temperature of the pellet relative to the cladding, the swelling of the pellet due to fission product generation, and the relatively little time for plastic deformation to occur substantially increase pellet-clad interaction during a sharp power increase. Making power changes very slowly partially alleviates this problem by allowing the pellet and cladding to plastically deform, effectively reducing cladding loads. However, these restrictions on the rates at which load following power changes may be made are particularly onerous to the operator of a nuclear power plant that must meet widely varying demands.

The prior art reveals an arrangement for attempting to align nuclear fuel pellets during the assembly of a nuclear fuel rod. See Canadian Pat. No. 725,277 to Hauser et al. However, that arrangement increases the resistance to plastic deformation at the pellet interfaces by providing pellets having interlocking male and female ends. Typically in the prior art arrangement alternate ends of the fuel pellet are provided with a projection and a projection-receiving opening, the projection-receiving opening having a depth greater than or equal to the height of the projection. When a plurality of such fuel pellets are stacked in end-to-end relationship, projections on the ends of the fuel pellets interlock with receiving openings on adjacent fuel pellets to lock the fuel pellets in position.

In the prior art interlocking pellet arrangements the fuel pellets contact each other over an annular area surrounding the projections and projection-receiving openings providing a large pellet contact area and a low mean temperature at the pellet interfaces. This large pellet contact area and low mean temperature results in low stresses in the pellets at the pellet interfaces and little plastic deformation of the pellets to reduce cladding stresses. Low stresses at the pellet interfaces result in higher cladding stresses and deformation of the cladding rather than deformation of the pellets. Prior art pellet designs having flat or "dished" ends suffer from the same disadvantages. (Dished pellets are formed with concave ends as shown, for example, by U.S. Pat. No. 3,365,371.) They have large pellet contact areas and low mean temperatures at the pellet interfaces resulting in deformation of the cladding rather than deformation of the pellets.

Another problem with the prior art interlocking pellet arrangement is the prohibitive expense of manufacture of the projection and projection receiving openings with manufacturing tolerances smaller than ±3 mils, and these errors have a cumulative effect on pellet misalignment. In most boiling water reactors the pellets and the cladding are separated by an annular gap of approximately 10 mils so it is still possible to get maximum tilting of the pellets with the prior art interlocking pellet arrangement.

It is the principal object of the present invention to provide a nuclear fuel pellet for use in a stacked column of pellets in a fuel element and having a shape that increases the plastic deformation of the pellet at the pellet interfaces so that mechanical interaction between the pellet and the cladding will create alignment forces great enough to deform the pellets and realign them without seriously loading the cladding.

Another object of the present invention is to provide an axially alignable fuel pellet that reduces pellet-clad interaction.

It is another object of the present invention to provide a nuclear fuel pellet which will improve the operation of nuclear power plants by increasing the rate at which load-following power changes may be made without overstressing the fuel cladding due to pellet-clad interaction.

Another object of the present invention is to reduce the stochastic distribution of pellets during the assembly of a nuclear fuel rod.

Another object of the present invention is to reduce the amount of stress corrosion cracking in the cladding of a nuclear fuel rod.

Another object of the present invention is to provide a nuclear fuel element capable of higher absolute power levels without cladding failure.

SUMMARY OF THE INVENTION

Briefly stated these and other objects of the invention are achieved by providing a nuclear fuel pellet with a shape that increases plastic deformation of the pellets at the interfaces between the pellets of a fuel element and thereby lowers the forces required to realign the pellet. Increasing plastic deformation at the pellet interfaces allows mechanical interaction between the pellet and the cladding to create alignment forces great enough to realign an axially misaligned pellet without seriously loading the cladding. Plastic deformation of the pellets at the pellet interfaces is increased by providing a relatively small pellet-to-pellet contact area disposed near the center of the end face of the pellet. Since the pellet is much hotter toward the center, the mean temperature of the contact area is much higher. The increase in the mean temperature of the contact area reduces the strength and flow stress of the contact area, thus reducing the required alignment forces. The smaller contact area at the pellet interfaces concentrates alignment forces over a smaller area. This increases the stress at the interfaces which further reduces the required alignment forces. The geometry of fuel pellets constructed according to the present invention also reduces the forces required to straighten a fuel pellet which is tilted within the cladding.

Nuclear fuel pellets constructed according to the present invention are provided with at least one end having a centrally-disposed raised area of generally convex shape. The opposite end of the pellet may also have a generally convex shape, or it may be flat, or it may be provided with a centrally-disposed depression. The centrally-disposed depression has a depth less than the height of the centrally-disposed raised area to assure that the pellets will contact each other only over a small centrally-disposed area. The centrally-disposed raised area may be generally hemispherical in shape or generally conical in shape. The generally hemispherical or generally conical centrally-disposed raised areas may extend over substantially all or only a limited central portion of the end surface of the pellet. In a preferred embodiment either the generally hemispherical or generally conical centrally-disposed raised areas are provided with a flat centrally-disposed pellet-to-pellet contact surface.

In embodiments of the invention having a generally conical centrally-disposed raised area with a flat centrally-disposed surface, an annular area surrounding the centrally-disposed flat surface may be tapered sharply to the end surface of the pellet or may be tapered gradually to the side wall of the pellet. These two structures are referred to as buttons and crowns, respectively. Fuel pellets formed with buttons or crowns may be provided with buttons or crowns on both ends or with a single button or crown designed to interact with the flat end surface of an adjacent pellet. In order to further reduce the stochastic distribution of the pellet during the assembly of the fuel element, fuel pellets of the type having a button on one end may be provided with a button-receiving recess on the opposite end having a depth which is less than the height of the button.

DESCRIPTION OF THE DRAWINGS

FIG. 8 is a side view of a fuel pellet constructed according to the invention.

FIG. 9 is an end view of the fuel pellet of FIG. 8.

FIG. 11 illustrates another embodiment of the invention.

FIG. 12 is an end view of the pellet of FIG. 11.

FIG. 14 illustrates another embodiment of the invention.

FIG. 15 is an end view of the fuel pellet of FIG. 14.

DESCRIPTION OF THE PREFERRED EMBODIMENT

Figure 1:
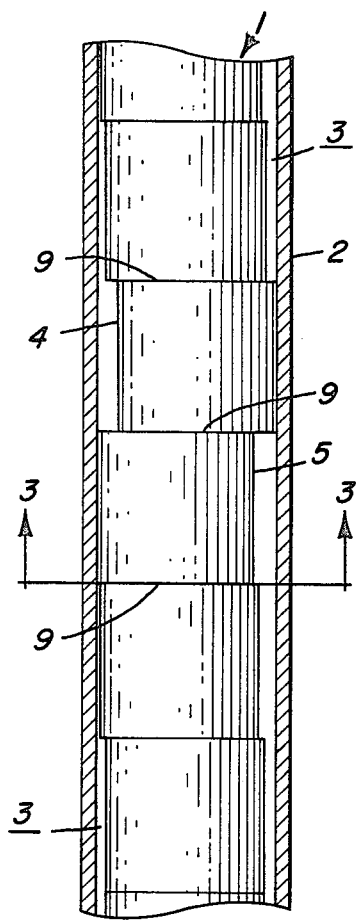
FIG. 1 is a view, partially in section, of a portion of a nuclear fuel rod having fuel pellets stacked with random centerline offsets.
Figure 2:
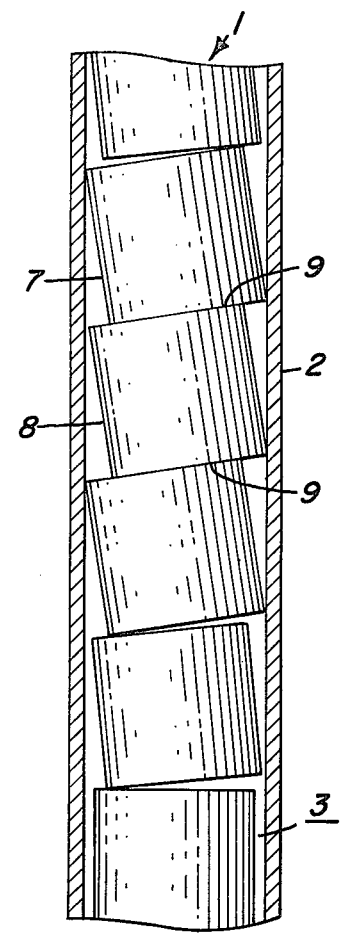
FIG. 2 is a view, partially in section, of a portion of a nuclear fuel rod having fuel pellets that are tilted within their cladding.

Referring to FIGS. 1 and 2, nuclear fuel elements are illustrated comprising a plurality of nuclear fuel pellets 1, represented here as right circular cylinders for the sake of simplicity, stacked in a column in end-to-end relationship within a tubular cladding 2. An annular gap 3 is provided between the pellets 1 and the cladding 2. The annular gap 3 accommodates the swelling of the pellets during irradiation due to fission product generation, the larger coefficient of thermal expansion of the pellets and the higher average temperature of the pellets relative to the cladding. The fuel pellets have an average temperature higher than the cladding because the cladding is directly cooled by surrounding reactor coolant. The gap 3 also provides necessary assembly tolerances. However, the annular gap 3 also allows the pellets to be stochastically or randomly stacked in the cladding during assembly. Stochastic stacking of the fuel pellets may simply result in axially misaligned pellets having a random centerline offset as shown in FIG. 1, or it may result in pellets that are rotated or tilted within the cladding as shown in FIG. 2, or it may result in both. Even if stochastic stacking is somehow minimized during the assembly of the fuel elements the cumulative effects of vibration, swelling and cracking of the pellets during irradiation tends to cause stochastic stacking of the fuel pellets.

Whether the fuel pellets assume centerline offset positions illustrated by pellets 4 and 5 in FIG. 1, or tilted positions illustrated by pellets 7 and 8 in FIG. 2 these axially misaligned pellets cause a substantial increase in cladding stress. This is because these pellets become virtually locked in axially misaligned positions due to friction at their compressively loaded interfaces 9. Compressive loading of the pellet interfaces 9 is a result of spring loading of the column of pellets, the weight of the pellets and, most importantly, friction between the sides of the pellets and walls of the cladding when the column of pellets expands axially during irradiation. Once pellets become locked in axially misaligned positions, subsequent swelling of the fuel pellets during power increases causes pellet-clad interaction which mechanically loads and damages the cladding.

Figure 3:
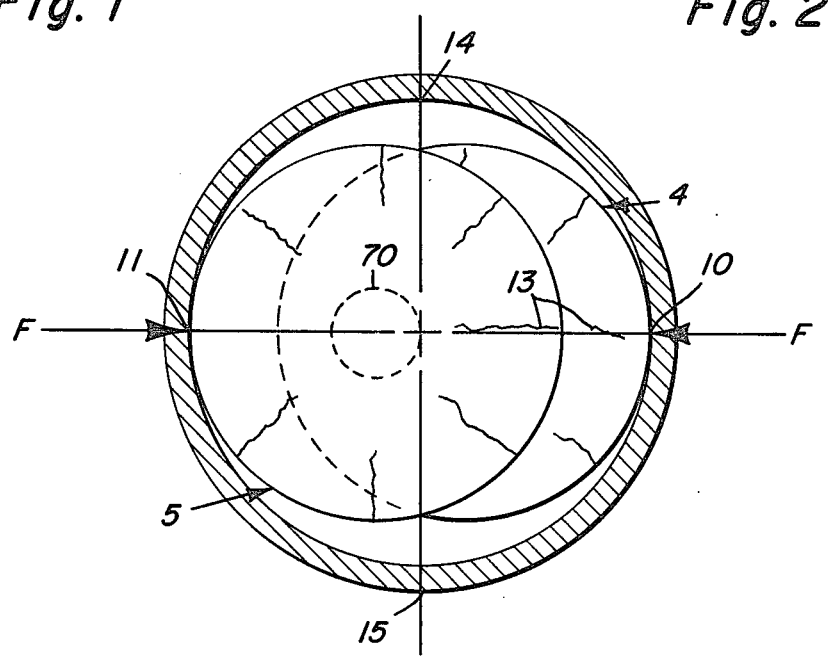
FIG. 3 is a cross sectional view taken along line 3—3 of FIG. 1.

Mechanical loading of the cladding due to pellet-clad interaction is most severe when two adjacent fuel pellets, such as 4 and 5 in FIG. 1, are in contact with opposite sides of the tubular cladding 2. Referring now to FIG. 3, when the pellets 4 and 5 expand due to a power increase, alignment forces F are exerted upon the pellets at pellet-clad interaction areas 10 and 11. Because the fuel pellets are much hotter in the center, thermally-induced stresses in the pellet cause radial cracks 13 to appear in the pellets during irradiation. The radial cracks that appear near the pellet-clad interaction areas 10 and 11 cause stress concentrations that further magnify cladding stress in these areas. Ultimately these stresses can cause plastic deformation of the cladding that leads to perforations in the cladding and the release of fission products to the reactor coolant. However, pellet-clad interaction forces also cause higher cladding stresses in non-contact areas and the cladding then has a greater propensity for stress corrosion cracking in non-contact as well as contact areas.

The present invention is based upon the recognition that if the force required to cause plastic deformation of the pellets at the pellet interfaces 9 is reduced, pellet-clad interaction will create alignment forces great enough to realign the pellets without seriously loading the cladding.

According to the invention, the forces required to cause plastic deformation at the pellet interfaces are lowered by providing a smaller pellet contact area located toward the center of the pellet. Since the pellet is much hotter toward the center the mean temperature of the contact area is much higher. The increase in the mean temperature of the contact area reduces the strength and flow stress of the contact area increasing the amount of pellet deformation in the contact area and reducing the required alignment forces. (The stress level at which a material will deform plastically is known generally in material science as the flow stress of the material.) The smaller pellet contact area also increases the shear stress at the pellet-to-pellet interfaces which also results in more ready pellet deformation.

A smaller pellet contact area is obtained by providing a fuel pellet with at least one end having a centrally-disposed raised area of generally convex shape. The optimum height and area of this raised portion of the pellet is difficult if not impossible to determine analytically. However referring now to FIGS. 4 and 5, practical embodiments of the invention are found to have a centrally-disposed raised area with a height, h, related to the height, H, of the pellet in the following manner:

$$0.01 \leq h/H \leq 0.2$$

Figure 4:
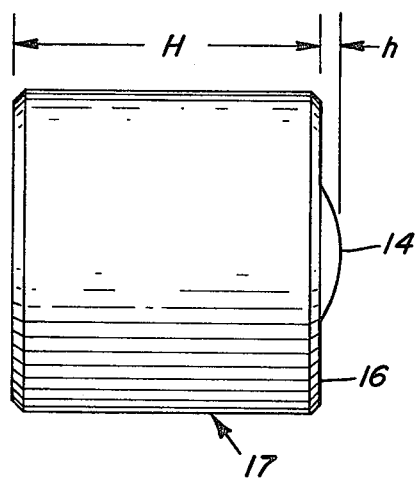
FIG. 4 is a side view of a fuel pellet constructed according to the invention.
Figure 5:
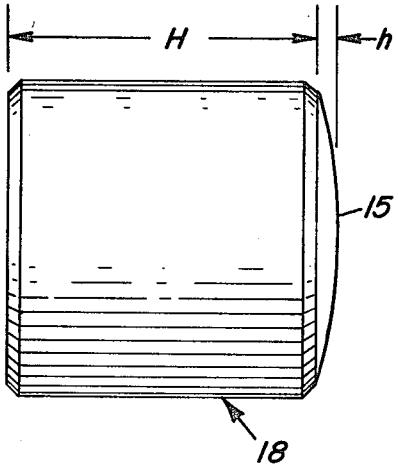
FIG. 5 is a side view of another embodiment of the invention.

The embodiments of the invention shown in FIGS. 4 and 5 are provided with centrally-disposed raised areas 14 and 15 which are generally hemispherical in shape. FIG. 4 illustrates an embodiment of the invention where the centrally-disposed raised area 14 covers only a portion of the end surface 16 of the pellet 17. FIG. 5 illustrates an embodiment of the invention where the centrally-disposed raised area 15 covers substantially the entire end surface of the pellet 18. Embodiments of the invention provided with one end having a centrally-disposed raised area which is generally hemispherical in shape may be provided with an opposite end having a centrally-disposed raised area, or the opposite end may be flat (as shown in FIGS. 4 and 5), or it may be provided with a centrally-disposed depression having a depth less than the height, h, of the centrally-disposed raised area.

Figure 6:
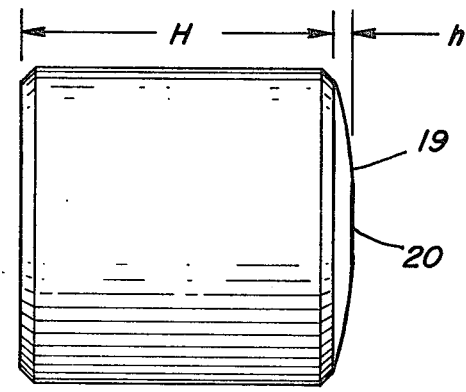
FIG. 6 is a side view of another embodiment of the invention.
Figure 7:
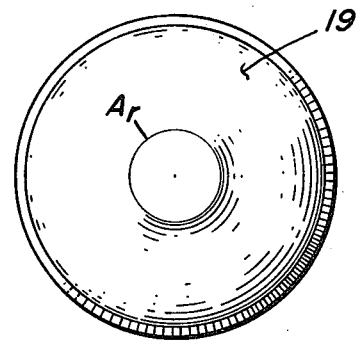
FIG. 7 is an end view of the fuel pellet of FIG. 6.

Referring now to FIGS. 6 and 7, in preferred embodiments of the invention a centrally-disposed raised area 19 is provided with a centrally-disposed flat surface 20, orthogonal to the longitudinal axis of the pellet, having an area $A_r$ that is related to the lateral cross-sectional area, $A_p$, of the pellet in the following manner:

$$0.0004 \leq A_r/A_p \leq 0.5$$

One limit to the minimum value for the ratio of $A_r/A_p$ is the smallest value which will assure that adjacent pellets will still contact each other on a flat surface at maximum offset with an annular gap of 10 mils. Another limit to the minimum value of this area ratio is the strength required of the raised area to resist crushing under anticipated compression loads at the anticipated operating temperature. The upper limit given for the ratio of $A_r/A_p$ is believed to be the largest area ratio that will still provide worthwhile advantage through use of the invention.

Pellets having a centrally-disposed raised area with a flat centrally-disposed surface orthogonal to the longitudinal axis of the pellet are preferred because the flat centrally-disposed surface helps reduce tilting and stochastic stacking of the pellets.

In a specific example of a fuel pellet constructed according to the present invention the following ratios were employed:

$$h/H = 0.035$$

$$A_r/A_p = 0.0625$$

The ratio of the height, h, of the centrally-disposed raised area to the height, H, of the pellet was chosen to be 0.035 since that ratio results in a fuel material volume loss of approximately 3% which corresponds to the fuel material volume loss in prior art pellet designs having dished ends and, therefore, is known as a tolerable fuel volume loss.

The ratio of the area, $A_r$, of the centrally-disposed flat surface to the cross-sectional area, $A_p$, of the pellet was chosen to be 0.0625 because this value represents a practical embodiment of the invention which significantly lowers cladding loads while providing sufficient strength to resist crushing of the raised area under the compression loading of the plenum spring and fuel column weight at the anticipated operating temperature.

The nuclear fuel pellets illustrated in the remaining drawings represent embodiments of the invention provided with at least one end surface having a centrally-disposed raised area that is generally conical in shape. Embodiments of the invention having a centrally-disposed raised area that is generally conical in shape may be provided with a centrally-disposed raised area that covers all or only a portion of the end surface of the pellet.

Figure 10:
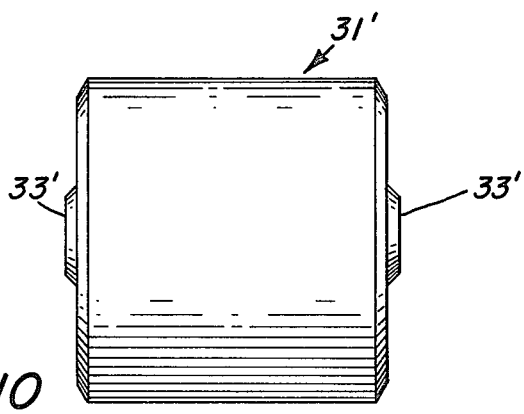
FIG. 10 illustrates another embodiment of the invention.

Referring now to FIGS. 8 and 9 a nuclear fuel pellet 31 is illustrated having one end 32 partially covered by a centrally-disposed raised area 33 that is generally conical in shape. The centrally-disposed raised area 33 has the shape of a truncated cone and is formed with a circular flat centrally-disposed surface 34, which is orthogonal to the longitudinal axis of the pellet, for contact with an adjacent fuel pellet in a fuel element. In the embodiment of the invention shown in FIGS. 8 and 9 the centrally-disposed flat surface 34 is surrounded by an annular area 35 that is tapered from the edge 36 of the circular flat centrally-disposed surface 34 to an edge 37 on the end 32 of the pellet 31. The remainder of the end surface of the pellet comprises a flat surface 38 that is orthogonal to the longitudinal axis of the pellet. This structure is hereinafter referred to as a button. Pellets employing a button may have an opposite end 39 that is flat. Alternatively, pellets employing the button may have a centrally-disposed button on both ends of the pellet as shown in FIG. 10 wherein a pellet 31' is formed with centrally-disposed raised surfaces at each end in the form of buttons 33'. One advantage of fuel pellets employing the button over other embodiments of the invention is that the button maintains a relatively small contact area with an adjacent pellet when subjected to axial deformation.

Referring now to FIGS. 11 and 12, in order to further reduce the stochastic stacking of the fuel pellets during the assembly of the nuclear fuel element, a pellet 41 employing a centrally-disposed button 42 on one end of the pellet may include a centrally-disposed button-receiving recess or depression 44 on the opposite end of the pellet. The centrally-disposed depression 44 has a shape generally conforming to the shape of the button but has a depth less than the height of the button.

Figure 13:
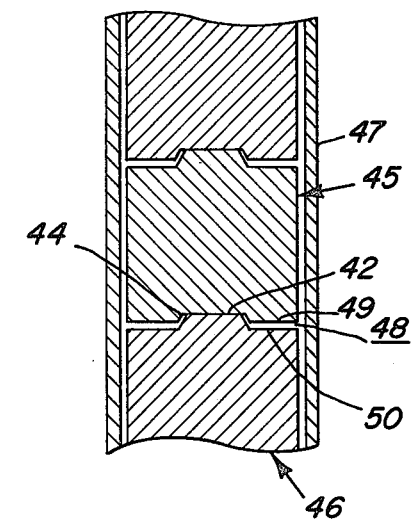
FIG. 13 is a cross section view of a portion of a nuclear fuel element employing the fuel pellet of FIG. 11.

Referring now to FIG. 13, pellets 45 and 46 have a shape corresponding to the pellet 41 shown in FIGS. 11 and 12 and have both a button and button-receiving depression. When pellets 45 and 46 are stacked in end-to-end relationship within a tubular cladding 47 of a fuel element, a gap 48 prevents the end surfaces 49 and 50 of the pellets from contacting and load bearing contact between the pellets is limited to the portion of the surface of the raised area 42 that is orthogonal to the longitudinal axis of the pellet. With contact between the pellets reduced to the small centrally-disposed raised area 42 the mean temperature and shear stress of the pellet interfaces is substantially increased. This greatly increases the likelihood that the raised area 42 will deform plastically, or shear, to allow the alignment of the pellets in the stack and lower cladding loads. Thus, the interlocking pellet constructed according to the present invention differs from prior art structures employing interlocking male and female ends by reducing the contact area to a small raised area and thereby increasing rather than decreasing plastic deformation of the pellets at the pellet interfaces.

Figure 16:
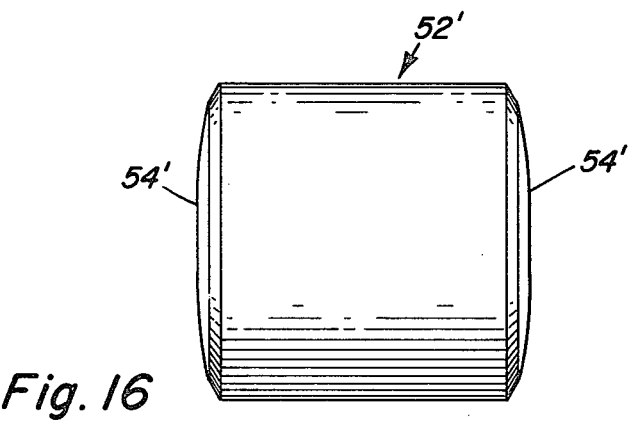
FIG. 16 illustrates another embodiment of the invention.
Figure 17:
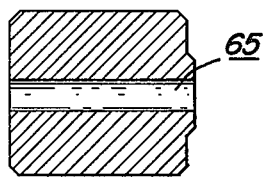
FIGS. 17, 19 and 21 each represent an embodiment of the invention.
Figure 18:
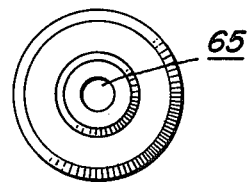
FIGS. 18, 20 and 22 are end views of the fuel pellets of FIGS. 17, 19 and 21, respectively.
Figure 19:
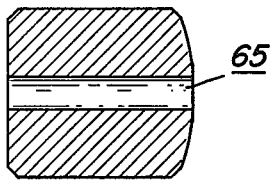
Figure 20:
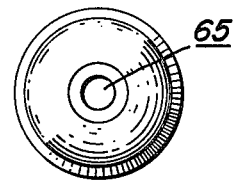
Figure 21:
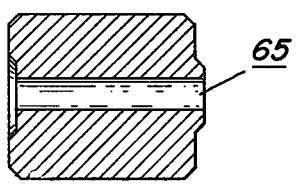
Figure 22:
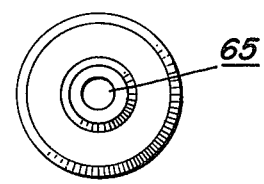

Referring now to FIGS. 14 and 15 a nuclear fuel pellet 52 is illustrated with one end surface formed in the shape of a truncated cone over substantially the entire end of the pellet to provide a raised end area 54 including a centrally-disposed circular flat surface 55 orthogonal to the longitudinal axis of the pellet. The centrally-disposed flat surface 55 is surrounded by an annular area 56 that is tapered from the edge 57 of the circular flat surface 55 to the side wall of the pellet 58. Pellets having this end structure are hereinafter referred to as having a crown. In the pellet shown in FIGS. 14 and 15 the opposite end is flat. Alternatively, as shown in FIG. 16 a fuel pellet may be provided with crowns 54' on both ends.

An advantage of forming a fuel pellet with a generally convex hemispherical or crown shape that covers most or all of the end surface of the pellet is an improved pressure distribution during the powder pressing process that is used to manufacture the fuel pellets. The familiar aspirin tablet shape of pellets having the hemispherical, or crown-shaped ends, is achieved by using specially shaped concave punches that eliminate pellet end capping problems often encountered with powders of low green strength. This configuration also provides a pellet with more uniform density as a result of increased pressing forces at the edges of the pellet which compensate for friction between the powder and the walls of the die cavity.

An additional advantage of pellets employing hemispherical or crown-shaped ends that cover substantially all of the end surface of the pellet is that the use of a fuel pellet having one such end and a flat opposite end (such as the pellet shown in FIG. 14) minimizes fuel volume loss due to the addition of the centrally-disposed raised area. This is an advantage since it is often desirable to fill a fuel element as fully as possible to maximize fuel loading.

It may be seen in all the illustrations of the various embodiments of the invention, and more specifically in FIG. 8 showing a pellet formed with a single button, that the edges 61 and 62 of both ends of the pellets may be chamfered to reduce the possibility of damage to the cladding due to point contact between the edges of the pellets and the cladding.

Referring now to FIGS. 17 through 22, pellets employing various embodiments of the present invention are illustrated having a coaxial bore 65 which minimizes the central temperature of the pellet thereby lowering thermal stresses in the pellet. Any of the embodiments of the present invention may be provided with such a coaxial bore.

Referring again to FIG. 3, by reducing the contact area at the pellet interfaces to a smaller area, delineated by phantom lines 70, the alignment forces F are concentrated over the smaller contact area. This increases the stress level at the pellet interfaces and also places the contact area near hottest portion of the pellet which substantially reduces the alignment forces F.

Figure 23:
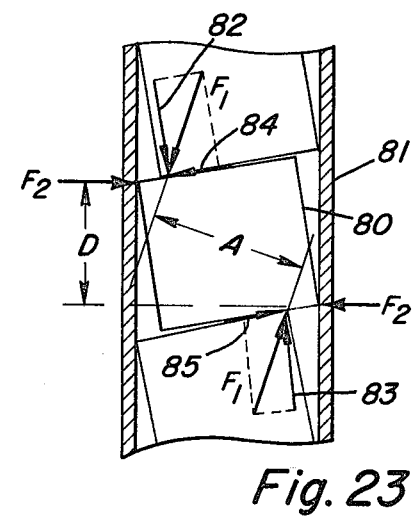
FIG. 23 is a view of a portion of a nuclear fuel rod illustrating the realignment forces required to straighten conventional fuel pellets that are tilted within the cladding.
Figure 24:
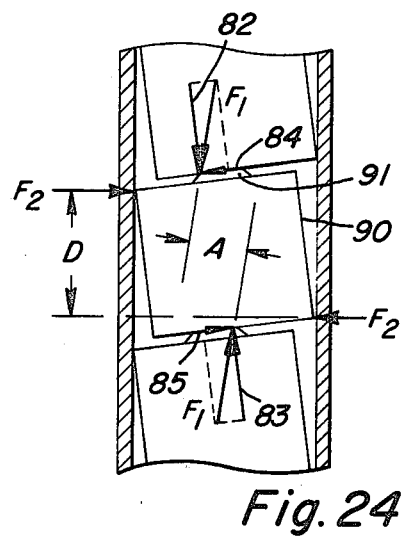
FIG. 24 is a view of a portion of a nuclear fuel rod employing pellets constructed according to the present invention and illustrating realignment forces required to straighten tilted fuel pellets.

Referring now to FIG. 2 and to FIGS. 23 and 24 it is illustrated that the geometry of a pellet constructed according to the present invention also significantly reduces the alignment forces required to axially align pellets, such as 7 and 8 in FIG. 2, that are tilted and locked within the fuel cladding.

FIG. 23 illustrates a conventional fuel pellet 80 that has tilted and locked within its cladding 81. As the pellet 80 swells during irradiation, alignment forces $F_2$ are exerted on the pellet in pellet-clad interaction areas. These alignment forces create a restoring moment tending to realign the pellet which may be approximated by the moment $F_2D$. Normal forces 82 and 83, due to compressive loading of the pellet interfaces, and frictional forces 84 and 85 at the pellet interfaces resist the realignment of the pellet 80. The vector sums of normal and frictional forces may be approximated by the forces illustrated as $F_1$. The moment resisting the realignment of the pellet 80 may then be approximated by the moment $F_1A$. Assuming static equilibrium, moments may be summed so that:

$$F_2D = F_1A \qquad (1)$$

$$F_2 = (F_1A)/D \qquad (2)$$

Thus, realignment forces $F_2$ are directly proportional to the dimension A and the vector sums $F_1$ of the normal and frictional forces at the pellet interfaces.

Referring now specifically to FIG. 24 the forces exerted on a pellet 90 having a button 91 on one end are illustrated. Forces and dimensions are like those of FIG. 23 and are given the same alphanumeric designation. As in FIG. 23 the alignment forces $F_2$ are directly proportional to the dimension A and the vector sums $F_1$ of the normal and frictional forces at the pellet interfaces. However, in FIG. 24 the addition of the button 91 significantly reduces both the vector sums $F_1$ and the dimension A. The vector sum $F_1$ on the button in FIG. 24 is less than the vector sum $F_1$ in FIG. 23 because the button will deform and reduce the value of $F_1$. This is because the vector sum $F_1$ on the button in FIG. 24 acts over a much smaller and hotter (hence weaker) region of the fuel pellet. The dimension A is much smaller for the pellet in FIG. 24 because the button 91 moves the area of contact closer to the center of the pellet. According to equation (2) a decrease in either $F_1$ or A results in a proportional decrease in the alignment forces $F_2$.

Thus, it is shown forming fuel pellets with buttons or crowns at their ends significantly reduces the forces required to realign a pellet that is either tilted or axially offset within the fuel element cladding.

Other modifications of the invention will occur to those skilled in the art and it is desired to cover in the appended claims all such modifications as fall within the scope of the invention.

What is claimed is:

1. In a nuclear fuel element for use in a nuclear reactor, a generally cylindrical axially alignable fuel pellet having a given end surface and an opposite end surface and stacked in a column of a plurality of said pellets in end-to-end relationship within a tubular cladding of said fuel element with an annular gap between said pellets and said cladding and with the given end surfaces of the pellets of the stack abutting the opposite end surfaces of adjacent pellets of the stack, said given end surface of said pellet being formed with a centrally disposed raised area generally convex in shape, and said opposite end surface of said pellet having a shape such that the load-bearing contact area between the pellets in said stack is limited to a portion of the surface of said centrally disposed raised area of said given end surface that is orthogonal to the longitudinal axis of said pellet said contact area being limited sufficient to increase the mean temperature of said contact area during operation in said reactor to increase the ability of the pellets to deform plastically at their interface whereby the alignment forces required to straighten misaligned pellets in said column and the consequent loading on the cladding is decreased.

2. The nuclear fuel pellet of claim 1 wherein said centrally-disposed raised area occupies a limited portion of the end surface of said pellet.

3. The nuclear fuel pellet of claim 1 wherein said centrally-disposed raised area is generally hemispherical in shape.

4. The nuclear fuel pellet of claim 1 wherein said centrally-disposed raised area includes a centrally-disposed flat surface.

5. The nuclear fuel element of claim 1 wherein said centrally-disposed raised area has the shape of a truncated cone and includes a centrally-disposed flat surface.

6. The nuclear fuel pellet of claim 1 wherein said centrally-disposed raised area has a height, h, that is related to the height, H, of the pellet in the following manner:

$$0.01 \leq h/H \leq 0.2$$

7. The nuclear fuel pellet of claim 6 wherein the ratio of the height of said centrally-disposed raised area to the height of the pellet is:

$$h/H = 0.035$$

8. The nuclear fuel pellet of claim 6 wherein said centrally-disposed flat surface has an area, $A_r$, that is related to the transverse cross-sectional area, $A_p$, of the pellet, in the following manner:

$$0.0004 \leq A_r/A_p \leq 0.5$$

9. The nuclear fuel pellet of claim 8 wherein the ratio of the area of said centrally-disposed flat surface to the transverse cross-sectional area of the pellet is:

$$A_r/A_p = 0.0625$$

10. The nuclear fuel pellet of claim 5 wherein said centrally-disposed raised area occupies a limited portion of the end surface of said pellet.

11. The nuclear fuel pellet of claim 10 wherein the opposite end surface of said pellet has a centrally-disposed depression having a depth less than the height of said centrally-disposed raised area.

12. The nuclear fuel pellet of claim 5 wherein said centrally-disposed flat surface is circular.

13. The nuclear fuel pellet of claim 5 further including a coaxial bore.

14. The nuclear fuel pellet of claim 5 wherein the outer edges of both end surfaces of said pellet are chamfered.

15. In the nuclear fuel element of claim 1 wherein both said given end surface and said opposite end surface of each of said fuel pellets of said plurality of fuel pellets is formed with a centrally-disposed raised area generally convex in shape whereby pellet-to-pellet contact is limited to the raised areas of adjacent pellets in said stack.

16. The nuclear fuel element of claim 15 wherein each centrally-disposed raised area occupies a limited portion of the corresponding end surfaces of said pellets.

17. The nuclear fuel element of claim 15 wherein each centrally-disposed raised area occupies substantially the entire corresponding end surfaces of said pellets.

18. The nuclear fuel element of claim 15 wherein said centrally-disposed raised area includes a centrally-disposed flat surface.

19. The nuclear fuel element of claim 15 wherein said centrally-disposed raised area is generally conical in shape including a centrally-disposed flat surface.

20. The nuclear fuel element of claim 19 wherein each centrally-disposed raised area has a height, h, that is related to the height, H, of said pellet in the following manner:

$$0.01 \leq h/H \leq 0.2$$

21. The nuclear fuel element of claim 20 wherein the ratio of the height of said centrally-disposed raised area to the height of the pellet is:

$$h/H = 0.035$$

22. The nuclear fuel element of claim 20 wherein each centrally-disposed flat surface has an area, $A_r$, that is related to the transverse cross-sectional area, $A_p$, of the pellet in the following manner:

$$0.0004 \leq A_r/A_p \leq 0.5$$

23. The nuclear fuel element of claim 22 wherein the ratio of the area of said centrally-disposed flat surface to the transverse cross-sectional area of the pellet is:

$$A_r/A_p = 0.0625$$

24. The nuclear fuel element of claim 19 wherein each centrally-disposed raised area occupies a limited portion of the corresponding end surface of said pellet.

25. The nuclear fuel element of claim 19 wherein each centrally-disposed flat surface is circular.

26. The nuclear fuel element of claim 19 wherein each fuel pellet includes a coaxial bore.

27. The nuclear fuel element of claim 19 wherein each outer edge of each fuel pellet is chamfered.

28. In a nuclear fuel element for use in a nuclear reactor a generally cylindrical axially alignable nuclear fuel pellet of the type stacked in end-to-end relationship in a column of a plurality of said pellets within a tubular cladding of said fuel element with an annular gap between the fuel pellets therein and said tubular cladding wherein one end portion of said pellet has the form of a truncated cone including a centrally disposed flat surface, and the opposite end surface of said pellet is flat, the said one end portions of the pellets being in the same direction in said column whereby said flat surface provides reduced contact area between pellets and enhances plastic deformation thereof during operation in said reactor to reduce loading on the cladding.

29. The nuclear fuel pellet of claim 28 wherein the truncated conical end portion has a height, h, that is related to the height, H, of the pellet in the following manner:

$$0.01 \leq h/H \leq 0.2$$

30. The nuclear fuel pellet of claim 29 wherein the ratio of the height of said truncated conical end portion to the height of the pellet is:

$$h/H = 0.035$$

31. The nuclear fuel pellet of claim 28 wherein said centrally-disposed flat surface has an area, $A_r$, that is related to the cross-sectional area, $A_p$, of the pellet in the following manner:

$$0.0004 \leq A_r/A_p \leq 0.5$$

32. The nuclear fuel pellet of claim 31 wherein the ratio of the area of said centrally-disposed flat surface to the transverse cross-sectional area of the pellet is:

$$A_r/A_p = 0.0625$$

33. The nuclear fuel pellet of claim 28 further including a coaxial bore.

34. The nuclear pellet of claim 28 wherein the outer edges of both end surfaces of said pellet are chamfered.

35. In a nuclear fuel element for use in a nuclear reactor a generally cylindrical axially alignable nuclear fuel pellet of the type stacked in end-to-end relationship in a column of a plurality of said pellets within a tubular cladding of said fuel element with an annular gap between the fuel pellets therein and said tubular cladding wherein each end portion of said pellet has the form of a truncated cone including a centrally disposed flat surface whereby said flat surface provides reduced contact area between said pellets and enhances plastic deformation thereof during operation in said reactor to reduce loading on said cladding.

36. The nuclear fuel pellet of claim 35 wherein the truncated conical end portion has a height, h, that is related to the height, H, of the pellet in the following manner:

$$0.01 \leq h/H \leq 0.2$$

37. The nuclear fuel pellet of claim 36 wherein the ratio of the height of said truncated conical end portion to the height of the pellet is:

$$h/H = 0.035$$

38. The nuclear fuel pellet of claim 35 wherein each centrally-disposed flat surface has an area, $A_r$, that is related to the cross-sectional area, $A_p$, of the pellet in the following manner:

$$0.0004 \leq A_r/A_p \leq 0.5$$

39. The nuclear fuel pellet of claim 38 wherein the ratio of the area of said centrally-disposed flat surface to the transverse cross-sectional area of the pellet is:

$$A_r/A_p = 0.0625$$

40. The nuclear fuel pellet of claim 35 further including a coaxial bore.

41. The nuclear fuel pellet of claim 35 wherein the outer edges of both end surfaces of said pellet are chamfered.

42. In a nuclear fuel element for use in a nuclear reactor a generally cylindrical axially alignable nuclear fuel pellet of the type stacked in end-to-end relationship in a column of a plurality of a said pellets within a tubular cladding of said fuel element with an annular gap between the fuel pellets therein and said tubular cladding wherein each end portion of said pellet is formed with a centrally disposed raised area generally hemispherical in shape having a centrally disposed flat surface whereby said flat surface provides reduced contact area between said pellets and enhances plastic deformation thereof during operation in said reactor to reduce loading on said cladding.

43. The nuclear fuel pellet of claim 35 wherein each centrally-disposed raised area has a height, h, that is related to the height, H, of the pellet in the following manner:

$$0.01 \leq h/H \leq 0.2$$

44. The nuclear fuel pellet of claim 36 wherein the ratio of the height of said centrally-disposed raised area to the height of the pellet is:

$$h/H = 0.035$$

45. The nuclear fuel pellet of claim 35 wherein each centrally-disposed flat surface has an area, $A_r$, that is related to the cross-sectional area, $A_p$, of the pellet in the following manner:

$$0.0004 \leq A_r/A_p \leq 0.5$$

46. The nuclear fuel pellet of claim 38 wherein the ratio of the area of said centrally-disposed flat surface to the transverse cross-sectional area of the pellet is:

$$A_r/A_p = 0.0625$$

47. The nuclear fuel pellet of claim 35 further including a centrally-disposed axial bore.

48. The nuclear fuel pellet of claim 35 wherein the outer edges of both end surfaces of said pellet are chamfered.